United States Patent [19]

Schmermund

[11] 3,931,561
[45] Jan. 6, 1976

[54] CURVE MILLING OR CURVE GRINDING MACHINES

[76] Inventor: Alfred Schmermund, 62 Kornerstrasse, 5820 Gevelsberg, Germany

[22] Filed: Dec. 6, 1973

[21] Appl. No.: 422,485

[30] Foreign Application Priority Data
Dec. 21, 1972 United Kingdom............. 59031/72

[52] U.S. Cl. .............................................. 318/571
[51] Int. Cl.². ........................................ G05B 19/24
[58] Field of Search .................................. 318/571

[56] References Cited
UNITED STATES PATENTS

| | | | |
|---|---|---|---|
| 3,015,806 | 1/1962 | Wang et al. ...................... | 318/571 X |
| 3,184,663 | 5/1965 | Mergler ........................... | 318/571 X |
| 3,191,111 | 6/1965 | Greene ............................ | 318/571 X |
| 3,541,417 | 11/1970 | Frank, Jr. ......................... | 318/571 |
| 3,698,267 | 10/1972 | Cutler .............................. | 318/571 X |

*Primary Examiner*—B. Dobeck
*Attorney, Agent, or Firm*—Sughrue, Rothwell, Mion, Zinn & Macpeak

[57] ABSTRACT

A milling or grinding machine for shaping a workpiece is disclosed wherein a shaping tool is displaced relative to a rotatable workpiece in accordance with coded displacement values of a series of signals stored on a perforated tape. The signals are extracted from the tape serially and are translated into command signals, which are applied to a stepping motor for imparting displacement to means supporting the shaping tool. The stored signals are extracted from the tape in response to output pulses derived from a frequency divider network, the input of which is connected to a pulse generator. The pulse generator is so coupled to means for rotating the workpiece as to provide a plurality of pulses for each predetermined angular displacement of the workpiece. The frequency divider network includes a plurality of successively connected frequency divider devices, each of which is manually settable to provide output pulses equal in number to the number of pulses applied to the input of the selected frequency divider device divided by the respective divider ratio to which the selected divider device is set. By adjusting the divider ratios set at the respective divider devices, the angular displacement of the workpiece is correlated with the displacement of the shaping tool in a predetermined manner.

6 Claims, 2 Drawing Figures

CURVE MILLING OR CURVE GRINDING MACHINES

BACKGROUND OF THE INVENTION

The invention relates to curve milling or curve grinding machines.

On machines of this kind, cam discs or cam cylinders are manufactured which have a curved surface conforming to a predetermined law. This conformity of the curve will be briefly designated as "the law of the curve". In some applications, the circumferential surface of a cam disc cylinder may describe an archimedean spiral.

Such machines have a workpiece spindle, on which the workpiece is firmly clamped and which is slowly rotated by a drive motor while the workpiece is machined by a suitable tool. The tool, such as a milling or grinding tool, is carried by a tool support, which is displaced in dependence upon the law of the curve to be machined on the rotating workpiece, while the workpiece spindle rotates about a fixed axis. The tool support is displaced relative to the axis of the workpiece spindle in dependence upon the displacement relationship predetermined by the law of the curve. Thus, each variation of the position of the workpiece due to the rotation of the workpiece spindle must be accompanied by an associated displacement of the tool support; when the desired curve in a definite region, the so called "dwell", has a constant radius, then the displacement of the tool during this period is, of course, zero.

It is known to store the mutually associated values corresponding to the angular displacement of the workpiece and to the displacement or stroke of the tool for a particular curved surface to be formed on the workpiece on a punched tape, or on a magnetic drum or other similar means and to let the angular displacement of the spindle and the linear stroke displacement of the tool take place in accordance with such stored data. This procedure is known as the so called "path control". The numerical storage values are in this case converted into analogue values to interpolate between consecutive predetermined angular dispositions of the spindle and consecutive predetermined locations of the tool support.

It is known that a single master template may be utilized to control the displacement of the tool support in a machine tool when curved surfaces are to be produced on respective workpieces which differ from each other only in scale. In such a known machine, the displacement of the master template takes place in proportion to angular displacement of the workpiece spindle in an analogue fashion and the transmission of the requisite corresponding displacement to the tool support, which displacement is determined by the shape of the master template, also takes place in an analogue fashion. The stroke scale factor is set by a linkage effective in the scanning of the master template, while the angle scale factors are embodied by different time control curves. This machine requires for each curve law only a single master template. This machine requires for each curve law only a single master template. The displacement of the master template is controlled by a time control curve having a shape dependent on the particular angular extents of the individual rise, fall and dwell sections of the cam profile to be produced by the machine. Thus, although only a single master template is required to produce each cam profile of a family of cam profiles, each having the same curve law, each different cam profile requires a different time control curve. However, a time control curve is substantially simpler to manufacture than a master template.

SUMMARY OF THE INVENTION

According to the present invention, there is provided a shaping machine comprising tool support means displaceably mounted on a frame, workpiece support means rotatably mounted on the frame, first displacement means to rotatably displace the workpiece support means, a control member displaceably mounted on the frame, second displacement means to displace the control member relative to the frame, coupling means to so couple the control member to the tool support means as to impart displacement of the tool support means in dependence upon the displacement of the control member, a repetitious signal generator coupled to the first displacement means to generate a predetermined number of repetitious signals on each predetermined angular displacement of the workpiece support means, divider means to provide an output signal on the generation of each of a predeterminable number of the repetitious signals, selectably operable setting means to set the divider means to determine the numerical value of the predeterminable number, storage means to store a series of signals each coded to represent a respective predetermined displacement of the tool support means, extractor means selectively connected to the divider means and responsive to successive ones of the signals output from the divider means and applied to the extractor means to serially extract the stored signals, and translator means connected to the extractor means to receive the signals extracted thereby, to translate the extracted signals into command signals each corresponding to the displacement represented by a respective one of the extracted signals, and to apply the command signals to the second displacement means.

The storage means may comprise a loop of either perforated or magnetic tape.

The second displacement means may comprise either an electrically operable stepping motor or a disc moving device with position control.

The repetitious signal generator may comprise an electrical pulse generator.

The divider means may comprise a plurality of selectively selectable divider devices each having respective input means and respective output means, each divider device providing a plurality of said output signals at the respective output means corresponding to the number of the repetitious signals applied to the respective input means divided by a respective divider ratio settable by the setting means.

The repetitious signal generator may comprise pneumatic means coupled to the first displacement means to generate a predetermined number of repetitious pneumatic signals on each predetermined angular displacement of the workpiece support means.

The repetitious signal generator may comprise hydraulic means coupled to the first displacement means to generate a predetermined number of repetitious hydraulic signals on each predetermined angular displacement of the workpiece support means.

The repetitious signal generator may comprise a light source, and means responsive to light from the source and coupled to the first displacement means to generate a predetermined number of repetitious optical signals on each predetermined angular displacement of the workpiece support means.

BRIEF DESCRIPTION OF THE DRAWINGS

An embodiment of the invention will now be more particularly described with reference to the accompanying drawings, in which.

DESCRIPTION OF THE PREFERRED EMBODIMENTS

Figure 1:
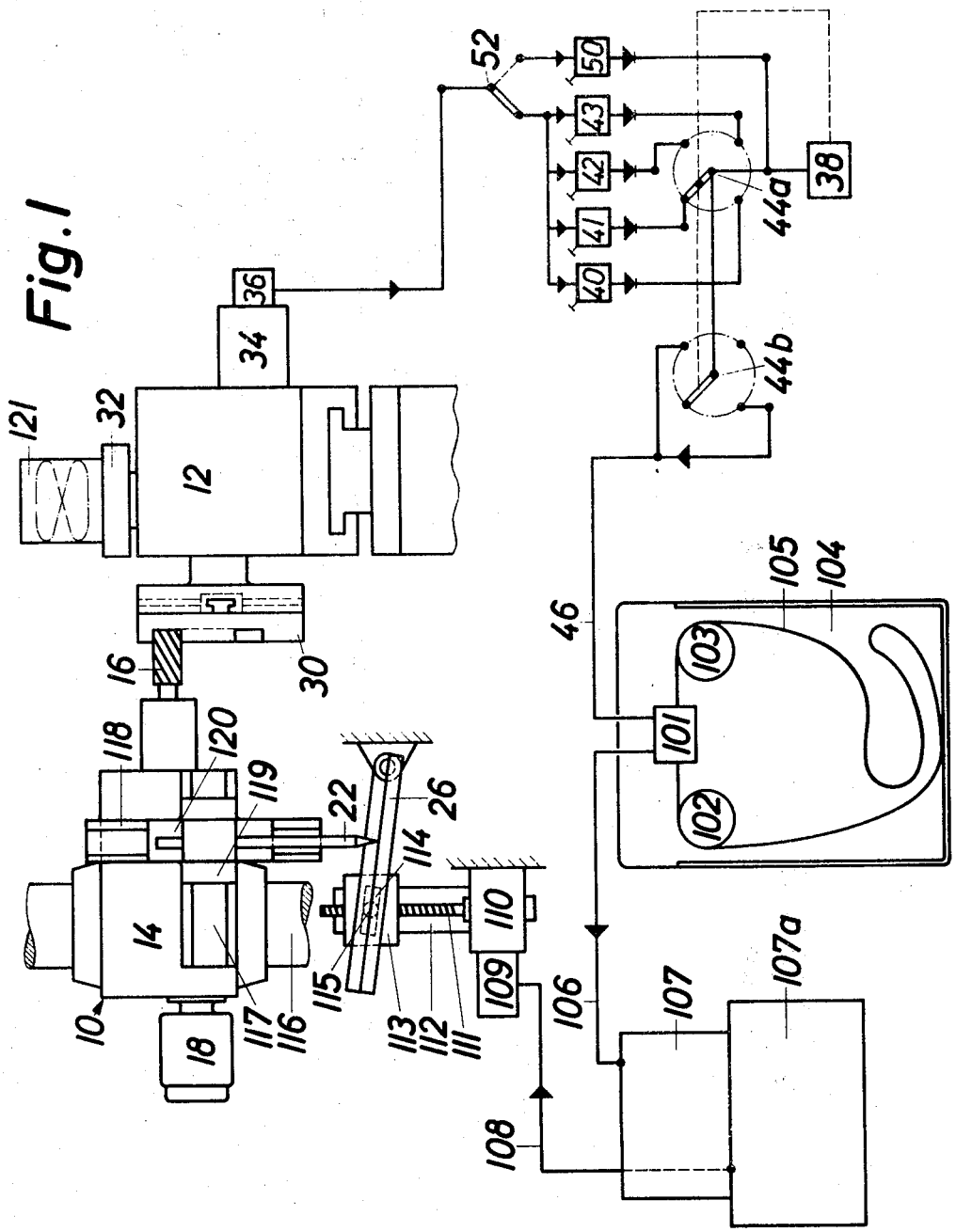
FIG. 1 shows a block schematic diagram of an automatically controlled machine tool for grinding or milling a curved surface on a workpiece in accordance with a first embodiment of the invention.
Figure 2:
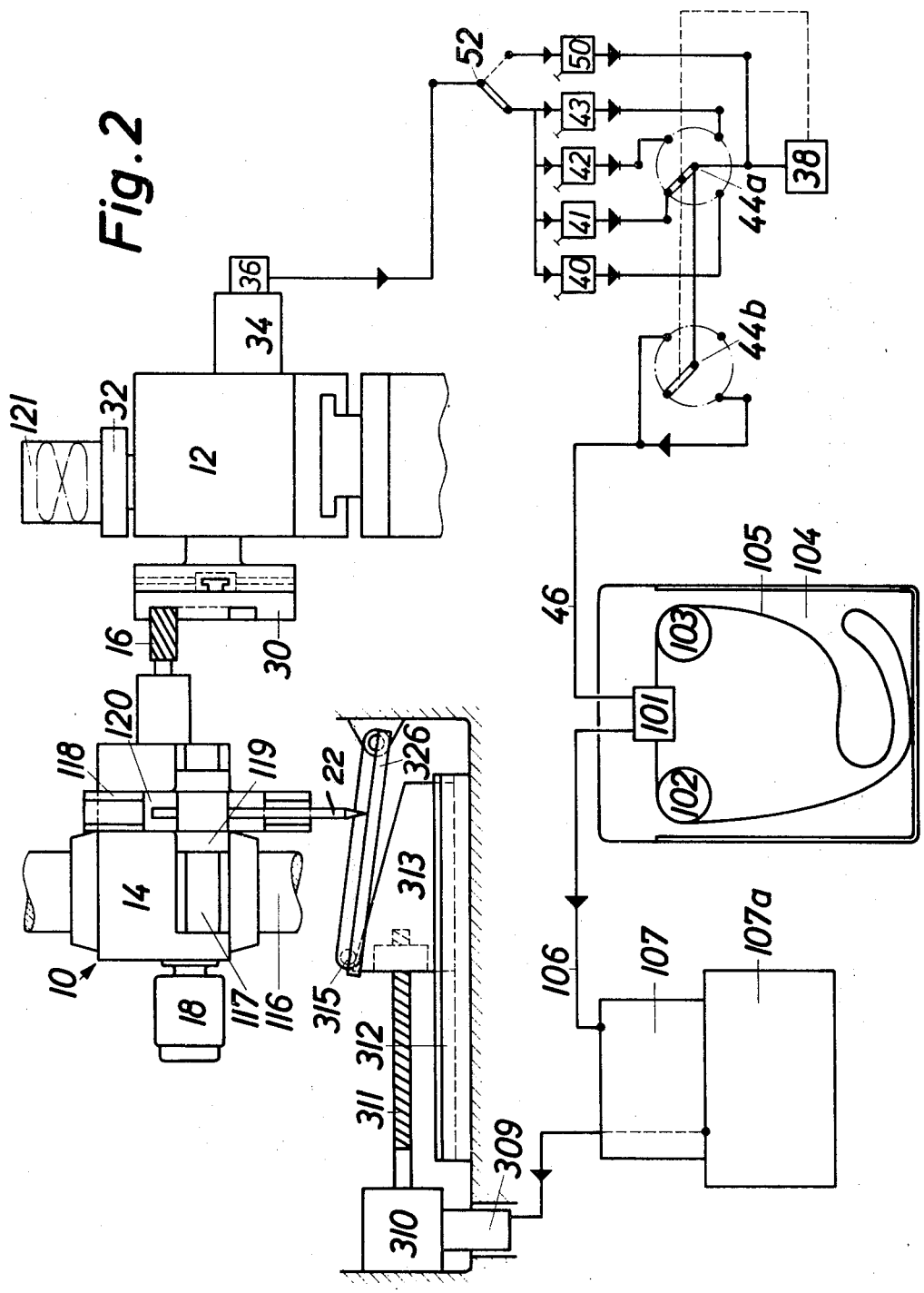
FIG. 2 shows a block-schematic diagram of an automatically controlled machine tool for grinding or milling a curved surface on a workpiece in accordance with a second embodiment of the invention.

FIGS. 1 and 2 of the drawings show tool support means 10 and workpiece support means 12 of a machine tool. The tool support 10 includes a slidable table 14, which is of settable height, to effect the application of a milling tool 16 to a workpiece mounted on a rotatable workpiece clamping means provided on a drive shaft 30. In the schematic diagram shown in FIG. 1, the tool support means 10 is mechanically coupled via a link cross-slide coupling of which the component parts are indicated by the reference numerals 117, 118, 119 and 120 to sensing means 26 and is vertically and/or horizontally displaceable relative to a supporting frame of the machine, which has been omitted from the drawing in the interests of clarity. However, the vertical and/or horizontal displacement of the tool support means 10 may be effected by hydraulically, pneumatically or other suitably operated means responsive to the displacement inparted to the sensing means 26. In the embodiment described with reference to the drawings, the tool support means 10 is displaced vertically. However, the tool support means 10 may alternatively, or additionally, be displaced horizontally, or even in three mutually perpendicular directions simultaneously.

As shown in FIG. 1, a pivotably mounted lever or control member 26 is angularly displaced in response to actuation of a stepping motor 109. The stepping motor 109 is coupled to the lever 26 via gearing 110, a threaded spindle 111 carrying a nut 113 provided with a slotted guide member 114, which is restrained from rotating with the spindle 111 by a fixed guide member 112. The slot in the guide member 114 engages a roller 115 rotatably mounted on the lever 26. The coupling arrangement is such that rotation imparted to the threaded spindle 111, causes the nut 113 to be displaced up or down the threaded spindle 111 in accordance with the direction of rotation of the latter. This vertical displacement of the nut 113 and the slotted guide member 114 causes angular displacement to be imparted to the lever 26. The lever 26 is coupled to the table 14 by sensing means including a feeler 22 which contacts the upper surface of the lever 26. The horizontal disposition of the feeler 22 relative to the lever 26, and hence the transmission ratio of the coupling arrangement, may be pre-set by adjusting the cross-slide members 117 and 119. The vertical position of the feeler member 22 may be pre-set by adjusting the cross-slide members 118 and 120.

FIG. 2 shows a block-schematic diagram which is very similar to that shown in FIG. 1 and corresponding components in these Figures are indicated by the same reference numerals.

The arrangement shown in FIG. 2 differs from that shown in FIG. 1 only in respect of the means for coupling the stepping motor, which is indicated in FIG. 2 by the reference numeral 309, to the feeler 22. In FIG. 2, the stepping motor 309 is coupled via gearing 310 to a threaded spindle 311. A nut on the threaded spindle 311 is secured to a wedge or control member 313 which is slidable to and fro along a guide groove provided in a fixed guide member 312. The upper side of the wedge 313 in the drawing is provided with a linear surface forming the floor of a slot in which a roller 315 runs.

In the embodiment illustrated in FIG. 2, the displacement means for vertically displacing the tool support means 10 relative to a support shaft 116 is controlled by control means (not shown) which is suitably responsive to control signals generated in response to the displacement of the sensing means 326. In the schematic diagram shown in the drawing, the sensing means comprises a pivotally mounted lever 326 which is coupled to the tool support means 10 via the feeler 22 and the displaceable cross-slide coupling member 117-120. The feeler 22 may be displaced along the length of the lever 326 to vary the displacement imparted to the tool support means 10 for a given angular movement of the sensing means 326. Also, as shown in FIGS. 1 and 2, mounted on the slidable tool support table is a direct current motor 18, which drives the milling tool 16 at a predetermined rate of rotation via suitable gearing means (not shown). The coupling arrangement which has been described above with reference to FIG. 2 is preferred in some applications to that which has been described in FIG. 1, since the arrangement including the wedge 313 shown in FIG. 2 enables the stroke of the displacement imparted to the tool 16 to be varied between wide limits. Thus, by altering the slope of the wedge surface sensed by the feeler 22, the length of the stroke imparted to the feeler 22, and hence to the tool 16, for a given displacement of the stepping motor 309 may be varied between wide limits.

This adjustment is additional to that provided in both FIG. 1 and FIG. 2 by varying the position of the feeler 22 relative to the lever 26 or 326. Also, with the coupling arrangement shown in FIG. 2, the slope of the wedge 313 may be made non-linear, thereby superimposing an additional component on the tool displacement imparted in response to each step displacement of the stepping motor 309.

As will subsequently be described, the feeler 22 will be displaced to impart such displacement to the milling tool 16 as will conform with the law of the curve to be milled on a workpiece for example, an acceleration trapezium, in the shape of a normalised feed (which can be varied in scale by adjustment of the coupling members 117-120 relative to the sensing means 26 or 326) distributed over a normalised displacement path.

By way of example, the operations for milling the circumferential surface of a workpiece to produce a camming surface will now be described.

A first portion of the peripheral surface of the disc workpiece is milled to provide an arcuate surface of constant radius, this portion corresponds to the upper dwell of a follower co-operating with the finished cam. A second portion, the fall portion, is a curved surface predetermined by the shaped profile of the template and is formed by lowering the milling tool 16 until it reaches its lowest position. A third portion, the lower dwell portion, is of constant radius. A fourth portion, the rise portion, is a curved surface formed by raising the milling tool in accordance with the displacements imparted to the sensing means on displacement of the lever 26 or 326 in a direction opposite to that followed during the formation of the first portion. A family of many different cam discs, each different in two variables, may be milled. The individual cam discs provided may differ in the distance between their upper and lower dwell portions — these are individually set for each cam disc to be produced by pre-setting the coupling ratio between the sensing means 26 or 326 and the tool support means 10. The individual discs in the family may also differ in the angular extents of the respective upper dwell, fall, lower dwell and rise portions in each individual disc. The "upper" and "lower" dwell portions are simply portions of constant radius, during the formation of which the sensing means remains stationary at a terminal value.

For the determination of the angular extents of the respective cam portions, a relationship between the vertical movement of the tool 16 and the rotation of the workpiece, must be predetermined. In the example which has been described, this relationship is individually settable for each of the four portions of the cam disc. In the embodiment of the invention described with reference to the drawing, an "electronic gearing" is provided which is adjustable to predetermine this relationship for each portion.

The workpiece support means 12 comprises at least one drive shaft on which the workpiece is firmly clamped. In the embodiment shown in the drawing, two mutually perpendicular drive shafts 30 and 32 are provided to enable curve discs and curve cylinders to be milled or ground. Both these drive shafts are coupled to a common direct current drive motor 34, via stepdown gearing (not shown in detail). The mutually perpendicular drive shafts 30 and 32 may be replaced by a single drive shaft which is so mounted that it may be angularly displaced through 90°.

Connected to the shaft of the drive motor 34 is a repetitious signal generator in the form of a pulse generator 36, which for each rotation of the shaft delivers a predetermined number of pulses —for example 2000 pulses — in uniform time sequence, the pulse repetition frequency being dependent on the speed of rotation of the shaft. The output of the pulse generator 36 is connected to the respective inputs of four frequency dividers 40, 41, 42, and 43, the dividing ratios of which are manually settable. A further frequency divider 50 will be referred to subsequently. A pulse store 38, is connected as shown to the outputs of the frequency dividers 40 to 43. The storage capacity of the store 38 has a predetermined value, for example 72,000 pulses.

The store is so connected together with the frequency dividers 40 to 43 that on the store 38 being counted down to zero, the next frequency divider is connected to the store 38 via an electronic switch — symbolically represented by a switch contact 44a. The store 38 is counted down to zero four times for each complete curved profiled cam disc to be produced by output pulses appearing at the output of each of the dividers 40 to 43. The dividers 40–43 are connected successively by the switch contact 44 during the formation of the four portions of the cam profile described, the switch contact 44 being displaced in response to control signals derived in per se known manner from the store 38. Selected ones of the pulses which drive the store 38 simultaneously drive, via switch 44b and a connection 46, electrical drive means (not shown) of a tape feeder 104 which, in the preferred embodiment, is provided with a loop of perforated tape 105. In response to the output pulses applied via the connection 46, a perforated tape drive motor (not shown) displaces the perforated tape loop 105 past a tape reader 101 to cause signals stored on the tape to be extracted and passed to translator means in the form of a control unit 107. During the formation of the upper and lower "dwell" portions of the workpiece profile, the application of pulses output from the divider devices 41 and 43 to the tape reader 101 is inhibited by the switch 44b. However, the pulses output from the divider devices 41 and 43 are applied during these dwell periods to countdown the store 38, thereby to determine the angular extent of the dwell portions of the workpiece profile.

The perforated tape 105 carries information relating the movement of the tool 16 to the law of the curve to be milled. The tape 105 is in the form of a closed tape loop which is guided over rollers 102 and 103. The precise form in which the tool displacement instructions are coded on the tape will not be described, since any one of a large number of suitable coding systems (patterns of perforation) per se known to those skilled in the art may be employed. By means of the perforated tape loop 105 are stored a plurality of successively arranged coded signals, each signal representing a respective incremental vertical displacement of the tool 16. Thus, the signals stored on the tape 105 represent successive ordinate or incremental ordinate values of a curve defining the successive requisite vertical displacements necessary to cause the tool 16 to mill a predetermined camming surface on the rotating workpiece 30. These values are expressed in suitably coded form, in terms of the number of incremental steps to be performed by motor 109 or 309 in order to impart an angular displacement to the lever 26 or 326 corresponding to the respective value stored on the tape 105. The coding system may be either analogue or digital. The actual vertical displacement imparted to the tool 16 in response to each step displacement of the motor 109 or 309 is determined by the ratio of the gearing 110 or 310, the pitch of the thread on the spindle 111 or 311, the distance between the roller 115 or 315 and the axis about which the lever 26 or 326 pivots, and the position of the point of contact between the feeler 22 and the lever 26 or 326. Additionally, in the arrangement shown in FIG. 2, the slope of the upper side of the wedge 313 will effect the displacement transmission ratio between the stepping motor 309 and the feeler 22.

The displacement values read from the tape 105 by the tape reader 101 are applied in the form of electrical pulses via a conductor 106 to the input of a control unit 107. The control unit or command amplifier 107 translates these electrical pulses into corresponding command signals determining the number of step displacements to be imparted to the stepping motor 109 or 309 for each coded incremental displacement value read from the tape 105. These command signals are suitably amplified in an amplifier 107a. Thus, the transmission ratio is suitably chosen, by adjusting the disposition of the feeler 22 relative to the lever 26 or 326, and a series of displacements are imparted to the tool 16 at times determined by the transmission of control pulses via the conductor 46. In the circuit arrangements shown in FIGS. 1 and 2, the control pulses fed via the conductor 46 are applied to gating means associated with the tape reader 101. These control pulses also control the displacement of the tape 105 by tape drive means, which are not shown in the drawings.

The times at which these control pulses are generated are related, by means of the electronic circuit including the frequency dividers 40 to 43 and 50, to the angular rotation of the workpiece drive shaft 30 or 32.

The displacement signals recorded in coded form on the tape 105 may be directionally coded so as to effect displacement of the stepping motor 109 or 309 in both a forward and a reverse direction, thereby controlling both upward and downward displacements of the tool 16. Thus, it is not necessary to reverse the direction of movement of the tape 105. The instructions successively recorded over the length of the closed tape loop correspond to complete the set of displacements to be imparted to the tool 16 as the workpiece is rotated through a complete revolution.

As will be appreciated by those skilled in the art, the perforated tape 105 may be replaced by other storage means, for example, magnetic tapes, or any other suitable storage means for storing a plurality of successively accessible coded values.

Also, the stepping motors 109 and 309 may be replaced by any suitable displacement means, such as a disc moving device with exact position control. Such a disc moving device comprises a rotatable disc coupled to disc position control means which is responsive to each command signal to impart an incremental angular displacement to the disc corresponding to the displacement represented by the extracted signal from the tape 105.

The wedge-shaped template 313 is displaced via a stepdown gear, which is so arranged that it is displaced through its entire length by exactly 72000 of the pulses applied to the stepping motor 309.

The stepdown between the shaft of the motor 309 and the workpiece spindle 30 amounts to 12960 : 1 = 36 × 360. That means, that the motor shaft needs 36 revolutions for one degree of workpiece rotation and the pulse generator 36 delivers 36 × 2000 = 72000 pulses for one degree of workpiece rotation. One recognises that in these circumstances, the set dividing ratios of the dividers 40 to 43 correspond to the number of the degrees of angle through which the workpiece is turned while the store 38 is counted down to zero. The setting of the angular displacements of the workpiece for which the upward or downward displacement of the slidable table 14 is to be effected and for which this is to stand still, is to be numerically equal to the respective divider ratios to which the dividers 40 to 43 are set. Thus, no converting calculations are required.

For switching over between the forward and return stroke displacements of the template 313, the stepping motor 309 is switched over from forward to reverse rotation. This switching over is carried out by switch means (not shown), which are associated with the stepping motor and which between "forward drive" and "reverse drive" positions are provided with a "no drive" position. The swtich means are operated in response to switch-over pulses derived at the outputs of the respective dividers, when coincidence with the respective resetting pulse derived from the store 38 is present. Thus, such a switch-over pulse is derived from the output pulse from the divider 42 which is coincident with the resetting pulse from the store 38, to cause the switching means associated with the stepping motor 309 to be switched to its no drive position. The switching means is maintained in this condition, to inhibit the application of pulses derived during the formation of the lower dwell portion of the workpiece to the stepping motor 309, until a further switch-over pulse is applied to the switch means. Such a further switch-over is derived from the divider 43 in coincidence with the last pulse preceding the upward displacement of the slidable table 14, that is the pulse coincident with the resetting pulse from the store 38. This latter switch-over pulse causes the switching means associated with the stepping motor 309 to be positioned in the forward drive position. Correspondingly, switch-over pulses are derived at the end of the formation of the rising portion of the workpiece profile and at the end of the formation of the upper dwell portion of the workpiece profile.

There is also provided a fifth frequency divider 50 which, for example, permits the milling of an archimedean spiral when the template is constructed as a simple triangle. According to the setting of the divider 50 — which can selectably be connected in circuit in place of the dividers 40 to 43 by means of the switch 52 — the spiral extends over a definite predetermined angle, for example 360° with a dividing ratio of 36 pre-set at the divider 50. Here again, the angular degrees according to their digits correspond to the setting of the dividers.

One recognises, that the template 313 is displaced that much more rapidly as the angle over which the total displacement is distributed becomes smaller. That means, that the whole cam profile is accurately produced, irrespective of whether the stroke alters rapidly or slowly so long as the displacement of the template 313 does not take place in too large steps. With a total length of template of 200 millimeters, which distance is traversed in 72000 steps, the template is moved through increments of 1/36 millimeter or about 0.03 millimeter. With a stepdown ratio of 10 : 1 of the coupling means coupling the sensing means to the tool support means and a maximum inclination of the template of 45°, this results in a tool displacement in increments of 0.003 milimeter for each step of the motor 309. Thus, the incremental displacements of the tool support means should lie below the surface irregularity of the miller. The number of the increments though theoretically unlimited in a template, is however determined by the incremental interrogation. By choice of other numerical values, one can of course still further improve the accuracy, particularly when the workpiece is to be ground rather than milled.

In the embodiment which has been described, each of the pulses coming from the pulse generator 36 represents by virtue of its duration (or separation) an incremental angular displacement of the workpiece attached to the spindle 30; the faster the workpiece spindle 30 rotates, the higher is the pulse repetition frequency. If one were to apply this pulse sequence directly to the stepping motor 309, then a different template (or a different pulse generator) would be needed for each desired angular extent; this approach, although it could be taken, would be impractical, since the equipping time would be appreciable. By means of the pulse frequency dividers 40 to 43 (one of which is co-ordinated as described to each portion of the complete curved profile to be formed) the ratio between the angle of rotation of the workpiece and the advance of the template is settably modified, since according to the division ratio set at the selected divider only each $n^{th}$ pulse is applied to the tape drive motor, wherein $n$ represents the set division ratio. In order to be able to accommodate several curve portions on one and the same cam disc, a corresponding plurality of frequency dividers is provided.

In the embodiment of the invention which has been described above electronic components are utilised to relate the displacement of the template to the angular displacement of the workpiece. However, components which do not operate electronically, for example, pneumatic optical or hydraulic components, may be utilised for this purpose. Arrangements utilising different means for transmitting information to correlate the displacement of the template with the angular displacement of the workpiece fall within the scope of the invention.

In one such further embodiment, pneumatically operated means are coupled to the shaft of the motor 34 which are arranged to generate a predetermined number of repetitious pneumatic signals on each revolution of the motor shaft. Also, hydraulically operated means may be utilised to generate the repetitious signals. Similarly, hydraulically operated means may be used to displace the template 313, these means either being coupled to the repetitious signal generator via hydraulic components or being coupled via suitable transducing means to the electrical pulse generator and frequency divider devices.

In another embodiment, the repetitious signal generator comprises a light source and means responsive to light from the source to generate the repetitious signals.

I claim:

1. A shaping machine comprising, in combination:
a frame;
tool support means displaceably mounted on said frame;
workpiece support means rotatably mounted on said frame;
first displacement means to rotatably displace said workpiece support means;
a control member displaceably mounted on said frame;
second displacement means to displace said control member relative to said frame;
coupling means to couple said control member to said tool support means, thereby to impart displacement to said tool support means in dependence upon the displacement of said control member;
a repetitious signal generator coupled to said first displacement means to generate a predetermined number of repetitious signals on each predetermined angular displacement of said workpiece support means;
divider means to output a signal on the generation of each of a predeterminable number of said repetitious signals, said divider means comprising a plurality of divider devices each having respective input means and respective output means, each said divider device providing a plurality of said output signals at said respective output means corresponding to the number of said repetitious signals applied to said respective input means divided by a respective divider ratio;
selectably operable setting means to set each said divider device to said divider ratio and thereby to determine the numerical value of said predeterminable number;
first storage means to store said output signals derived from said divider means;
means to derive control signals from said first storage means in dependence on the state thereof;
first connector means responsive to said control signals to connect the respective output means of each said divider device successively to said first storage means;
second storage means to store a series of signals each coded to represent a respective predetermined displacement of said tool support means;
extractor means;
second connector means responsive to said control signals to successively connect the respective output means of selected ones of said divider devices to said extractor means, said extractor means being responsive to successive ones of said signals output from said divider means and applied to said extractor means to serially extract respective ones of said stored signals from said second storage means; and
translator means connected to said extractor means to receive said signals extracted therefrom, to translate said extracted signals into command signals each corresponding to the displacement represented by a respective one of said extracted signals, and to apply said command signals to said second displacement means.

2. A machine as defined in claim 1, wherein said second storage means comprises a plurality of serially accessible storage locations each storing a respective one of said coded signals, and said extractor means comprises read-out means displaceable relative to said locations to serially extract said stored signals in response to said signals output by said divider means and applied to said extractor means.

3. A machine as defined in claim 2, wherein said second storage means comprises a loop of perforated tape.

4. A machine as defined in claim 2, wherein said second storage means comprises a loop of magnetic tape.

5. A machine as defined in claim 1, wherein said second displacement means comprises a stepping motor, and said command signals generated by said translator means each comprise a plurality of pulsed signals corresponding in number to the incremental displacement represented by the respective one of said extracted signals.

6. A machine as defined in claim 1, wherein said second displacement means comprises a rotatable disc coupled to disc position control means, said position control means being responsive to each said command signal to impart an incremental angular displacement to said disc corresponding to the displacement represented by the extracted signal corresponding to the respective command signal.

* * * * *